US005672817A

United States Patent [19]

Sagisaka et al.

[11] Patent Number: 5,672,817

[45] Date of Patent: Sep. 30, 1997

[54] SELF-DIAGNOSTIC APPARATUS OF AIR-FUEL RATIO CONTROL SYSTEM OF INTERNAL COMBUSTION ENGINE

[75] Inventors: Yasuo Sagisaka, Komaki; Masaaki Nakayama, Toyoake; Yasuo Mukai, Kariya; Yukihiro Yamashita, Kariya; Hisashi Iida, Kariya, all of Japan

[73] Assignee: Nippondenso Co., Ltd., Kariya, Japan

[21] Appl. No.: 574,211

[22] Filed: Dec. 13, 1995

[30] Foreign Application Priority Data

Dec. 28, 1994 [JP] Japan .................................... 6-328086

[51] Int. Cl.$^{6}$ .......................... F02D 41/14; G01M 15/00

[52] U.S. Cl. ....................... 73/118.1; 73/23.32; 73/117.3; 123/672; 123/688; 364/431.051; 364/431.062; 60/276

[58] Field of Search .......................... 73/115, 116, 117.2, 73/117.3, 118.1, 118.2, 23.31, 23.32; 364/431.03, 431.04, 431.05; 123/672, 688; 60/276

[56] References Cited

U.S. PATENT DOCUMENTS

| | | | |
|---|---|---|---|
| 3,948,228 | 4/1976 | Luchaco | 73/116 |
| 4,980,834 | 12/1990 | Ikeda et al. | 73/118.2 |
| 5,065,728 | 11/1991 | Nakaniwa | 123/489 |
| 5,168,859 | 12/1992 | Ohsaki | 73/116 |
| 5,179,924 | 1/1993 | Manaka | 123/682 |
| 5,325,711 | 7/1994 | Hamburg et al. | 73/118.1 |
| 5,335,539 | 8/1994 | Sweppy et al. | 73/118.1 |
| 5,423,203 | 6/1995 | Namiki et al. | 73/118.1 |
| 5,485,382 | 1/1996 | Seki et al. | 73/118.1 |
| 5,488,858 | 2/1996 | Achleitner | 73/118.1 |
| 5,526,798 | 6/1996 | Seki | 73/118.1 |

FOREIGN PATENT DOCUMENTS

| | | |
|---|---|---|
| 0 616 121 | 9/1994 | European Pat. Off. . |
| 41 17 986 | 11/1991 | Germany . |
| 60-192849 | 10/1985 | Japan . |
| 60-233343 | 11/1985 | Japan . |
| 62-250351 | 10/1987 | Japan . |
| 4016757 | 1/1992 | Japan . |

*Primary Examiner*—Georg M. Dombroske
*Attorney, Agent, or Firm*—Cushman, Darby & Cushman IP Group of Pillsbury Madison & Sutro LLP

[57] ABSTRACT

A self-diagnostic apparatus of an air-fuel ratio control system of an internal combustion engine performs processes of starting the diagnostic process as the fuel-cut is started, reading and storing a sensor output at the start of the fuel-cut and counting an elapsed time after the start of the fuel-cut by actuating a timer, reading a time until when the sensor output rises from the start of the fuel-cut from the count value of the timer, calculating a rate of change of the sensor output and comparing the calculated rate of change with an abnormality determining value. When the rate of change is large, the response characteristic of the sensor is normal. When it is small, the response characteristic of the sensor is abnormal (degraded), so that the abnormality of the sensor is stored in a memory and an alarm lamp is lighted to inform a driver of the abnormality of the sensor.

26 Claims, 15 Drawing Sheets

FIG. 6
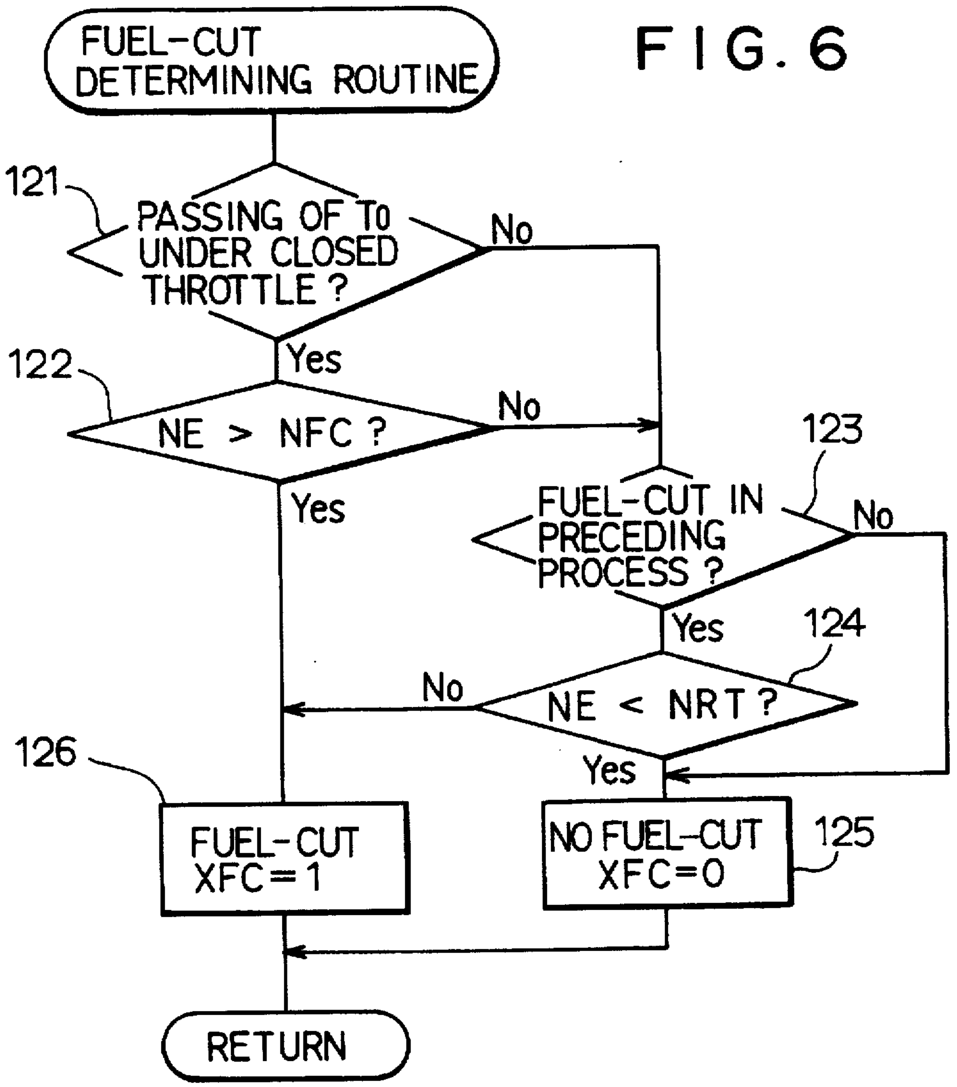
FIG. 7A
FIG. 7B
FIG. 7C
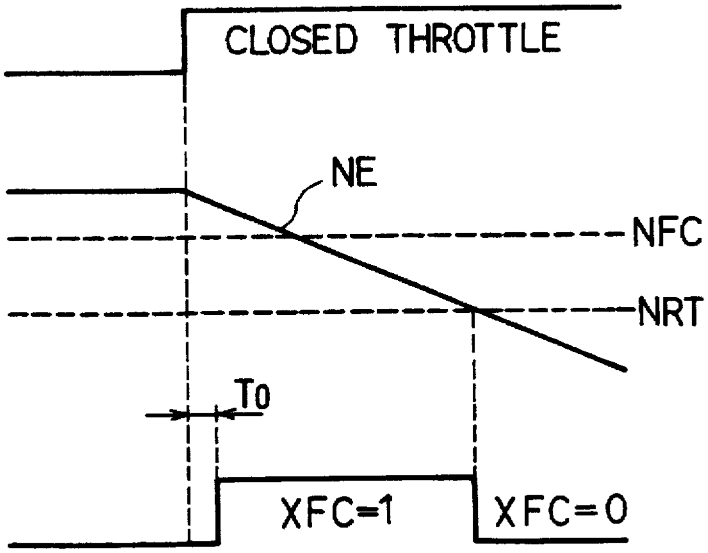

CLOSED THROTTLE

NRT
NE

XFC=1
XFC=0
I7
I8

NORMAL
ABNORMAL
I8

+
0
ΔI
Ifr1
-
T4

NORMAL
ABNORMAL

NO ALARM
ALARM

FIG. 15A
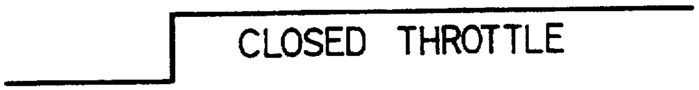
FIG. 15B
FIG. 15C
FIG. 15D
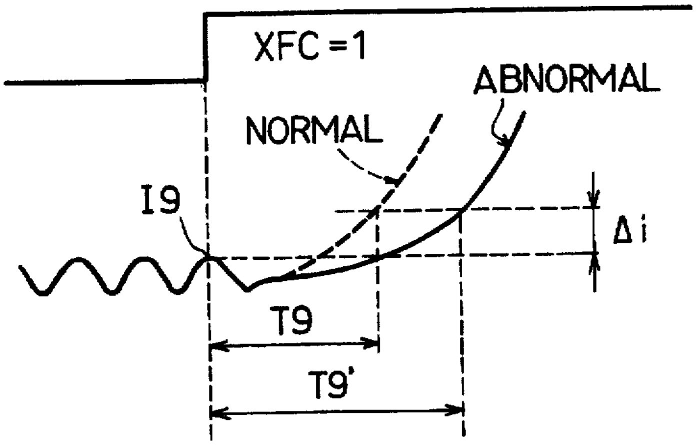
FIG. 15E
FIG. 15F

FIG. 17A
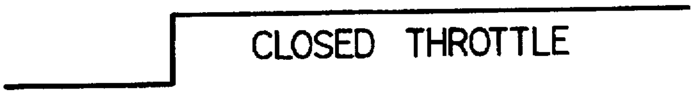
FIG. 17B
FIG. 17C
FIG. 17D
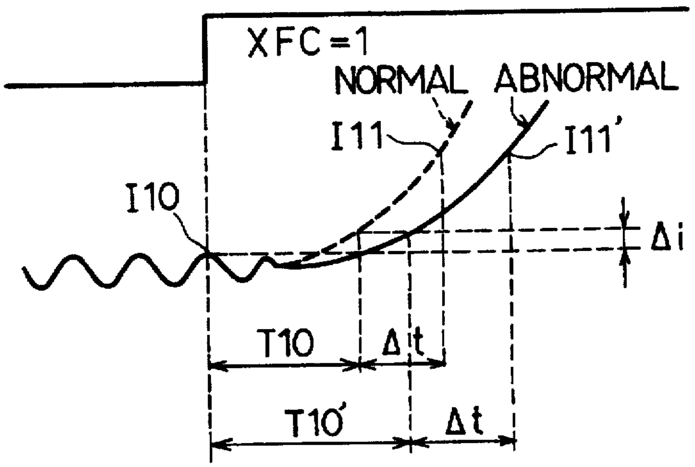
FIG. 17E
FIG. 17F

SELF-DIAGNOSTIC APPARATUS OF AIR-FUEL RATIO CONTROL SYSTEM OF INTERNAL COMBUSTION ENGINE

CROSS REFERENCE TO RELATED APPLICATION

This application is based on and claims the priority of Japanese Patent Application No. 6-328086 filed on Dec. 28, 1994, the content of which is incorporated herein by reference.

BACKGROUND OF THE INVENTION

1. Field of the Invention:

The present invention relates to a self-diagnostic apparatus of an air-fuel ratio control system of internal combustion engines for self-diagnosing an abnormality of the air-fuel ratio control system which feedback-controls an air-fuel ratio of air-fuel mixture supplied to the internal combustion engine.

2. Description of Related Art:

In an air-fuel ratio control system for feedback-controlling an air-fuel ratio of air-fuel mixture supplied to engines of automobiles, an oxygen sensor for detecting a concentration of oxygen present in an exhaust gas is mounted in an exhaust pipe to control the air-fuel ratio to be in the vicinity of a stoichiometric air-fuel ratio by comparing an output voltage of the oxygen sensor with a reference voltage which corresponds to the stoichiometric air-fuel ratio and by increasing/decreasing an air-fuel ratio feedback correction factor. If the output of the oxygen sensor deviates from a normal value due to the degradation of characteristics or to failure thereof, the controllability of the air-fuel ratio is degraded in such air-fuel ratio feedback control system.

In order to detect the failure of the oxygen sensor, there has been a system for diagnosing an existence of the failure of the oxygen sensor by comparing an output current of the oxygen sensor with a failure determination level after a certain period of time from the start of fuel-cut as disclosed in Japanese Patent Publication Laid-open No. 60-233343.

Although the sensor current detected after the certain period of time from the start of the fuel-cut is compared with the failure determination level in the prior art self-diagnostic method described above, the sensor current at the start of the fuel-cut varies even with the same sensor design depending on a state of the air-fuel ratio immediately before the fuel-cut and thereby, the time which the sensor current takes in reaching the failure determination level from the start of the fuel-cut varies. Therefore, the prior art method had a problem such that the diagnosis of the failure is largely affected by the state of the air-fuel ratio immediately before the fuel-cut and that it is unable to diagnose the failure or the degradation of the oxygen sensor accurately or its diagnostic accuracy is low.

SUMMARY OF THE INVENTION

Accordingly, it is an object of the present invention to solve the aforementioned problem.

It is a further object of the present invention to provide a self-diagnostic apparatus of an air-fuel ratio control system of internal combustion engines which can diagnose an existence of an abnormality of the sensor without being affected by the state of the air-fuel ratio before the start of the diagnosis and can improve the diagnostic accuracy.

According to one aspect of the present invention, a self-diagnostic apparatus of an air-fuel ratio control system of internal combustion engines detects a change in an amount of fuel supplied to the internal combustion engine, detects a rate of change of the output of an air-fuel ratio detecting sensor after detecting the change in the amount of supplied fuel, and determines an existence of an abnormality of the sensor on the basis of the detected rate of change of the sensor.

In this case, the rate of change of the sensor output after the start of the diagnosis is scarcely affected by the air-fuel ratio before the start of the diagnosis even when the sensor output, when the diagnosis is started (at the beginning, when the change in the amount of supplied fuel is detected), varies depending on the state of the air-fuel ratio before the diagnosis is started (before the change in the amount of supplied fuel is detected). Accordingly, the existence of the abnormality of the sensor may be diagnosed without being affected by the state of the air-fuel ratio before the start of the diagnosis by diagnosing the existence of the abnormality of the sensor on the basis of the rate of change of the sensor output.

A beginning of a fuel-cut or a continuation of fuel supply after the fuel-cut may be detected as the change in the amount of supplied fuel. Because the supply of fuel is stopped by starting the fuel-cut and the supply thereof is restarted after the fuel-cut, a large change in the amount of supplied fuel is caused by starting the fuel-cut and by ending the fuel-cut. Therefore, the start of the fuel-cut or the end of the fuel-cut is detected and thereby the change in the amount of supplied fuel is detected indirectly. The timing for starting the fuel-cut and ending the fuel-cut is controlled by an electronic engine control unit.

Alternatively, a variation per unit time may be detected as the rate of change of the output of the sensor. The variation per unit time may be determined by dividing the variation within a predetermined time by the predetermined time, by dividing a predetermined variation by a time necessary for that change or by providing a detection circuit for detecting the rate of change (gradient) of the sensor output by way of hardware.

A time until the output of the sensor changes by a predetermined value from when the amount of supplied fuel has changed may be measured and the rate of change of the output of the sensor may be determined by the length of the measured time. That is, a relationship is utilized such that the longer the measured time, the smaller the rate of change of the sensor output and the shorter the measured time, the greater the rate of change of the sensor output. In this case, the variation of the sensor output needs not be divided by the measure time.

Alternatively, a variation of the output of the sensor when within a predetermined time after when the amount of supplied fuel has changed may be detected and the rate of change of the output of the sensor may be determined by the degree of the variation. That is, the relationship is utilized such that the greater the variation within the predetermined time, the greater the rate of change of the sensor output and the smaller the variation within the predetermined time, the smaller the rate of change of the sensor output. In this case also, the variation need not be divided by the time.

Further, according to another aspect of the present invention, a self-diagnostic apparatus measures a response time lag until the output of the sensor starts to change from when the amount of supplied fuel has changed, instead of the rate-of-change determination, and determines an existence of the abnormality of the sensor on the basis of the response time lag.

This is based on the finding that the response characteristic of the sensor is apt to be worse as the characteristic of the sensor degrades and the response time lag until the sensor output starts to change after the amount of supplied fuel has changed is prolonged. The response time lag until the output of the sensor starts to change after the amount of supplied fuel has changed is measured, instead of the rate of change of the sensor output, and an existence of the abnormality of the sensor is determined by the abnormality determining means on the basis of the response time lag measured by the timer means. The existence of the abnormality of the sensor can be diagnosed without being affected by the state of the air-fuel ratio before the start of the diagnosis even when the diagnosis is made on the basis of the response time lag as described above.

BRIEF DESCRIPTION OF THE DRAWINGS

The above and other related objects and features of the present invention will be apparent from a reading of the following description of the disclosure together with the accompanying drawings, in which:

FIG. 6 is a flowchart showing a processing flow of a fuel-cut determining routine;

FIGS. 7A through 7C are time chatrts showing fuel-cut operation;

FIGS. 15A through 15F are time charts showing operation of the abnormality diagnosing process of the fifth embodiment;

FIGS. 17A through 17F are time charts showing operation of the abnormality diagnosing process of the sixth embodiment.

DETAILED DESCRIPTION OF PREFERRED EMBODIMENTS

Figure 1:
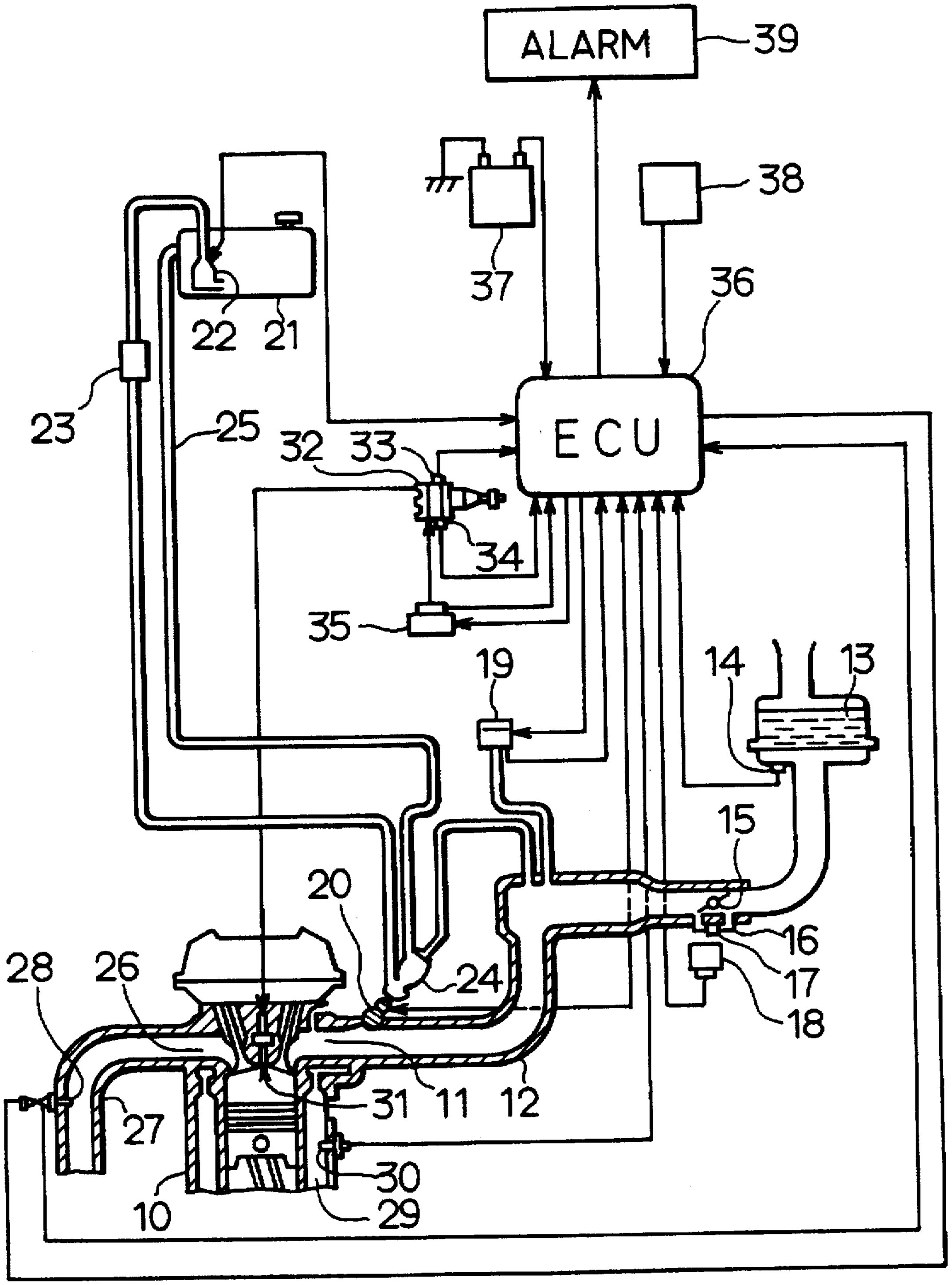
FIG. 1 is a schematic structural diagram of the whole engine control system illustrating a first embodiment of the present invention.

A first embodiment of the present invention will be explained below with reference to FIGS. 1 through 7. At first, a schematic structure of the whole engine control system including an air-fuel ratio control will be explained with reference to FIG. 1.

An air cleaner 13 is provided at the most upstream portion of an intake pipe 12 connected with an intake port 11 of an engine (internal combustion engine) 10 and an intake temperature sensor 14 is provided downstream of the air cleaner 13. A throttle valve 15 is provided on the middle portion of the intake pipe 12 and an idle speed control valve 17 is provided in a bypass path 16 bypassing the throttle valve 15. A throttle opening sensor 18 detects an opening of the throttle valve 15 and an intake pipe pressure sensor 19 connected to the intake pipe 12 detects a pressure in the intake pipe at the downstream of the throttle valve 15.

Further, a fuel injection valve 20 for injecting fuel supplied from a fuel tank 21 is provided near each intake port 11. The fuel within the fuel tank 21 is supplied to the fuel injection valve 20 via a route of a fuel pump 22, a fuel filter 23 and a pressure regulator 24. The pressure regulator 24 keeps the pressure of the fuel constant with respect to the pressure of the intake pipe and returns excess fuel to the fuel tank 21 via a return pipe 25.

Meanwhile, an air-fuel ratio sensor 28, whose output current changes generally proportionally corresponding to an air-fuel ratio (A/F) within an exhaust gas, and a three-way catalyst (not shown) for purifying the exhaust gas are provided in an exhaust pipe 27 connected to each exhaust port 26 of the engine 10. A water temperature sensor 30 for detecting a temperature of cooling water is mounted on a water jacket 29 for cooling the engine 10. A cylinder discriminating sensor 33 for discriminating a reference position of a crank angle of a specific cylinder and a crank angle sensor 34 outputting a pulse signal having a frequency corresponding to an engine speed are provided on an ignition distributor 32 for distributing a high tension ignition current to each ignition plug 31 of the engine 10. The distributor 32 is supplied with a high tension secondary current of an igniter 35.

Figure 5:
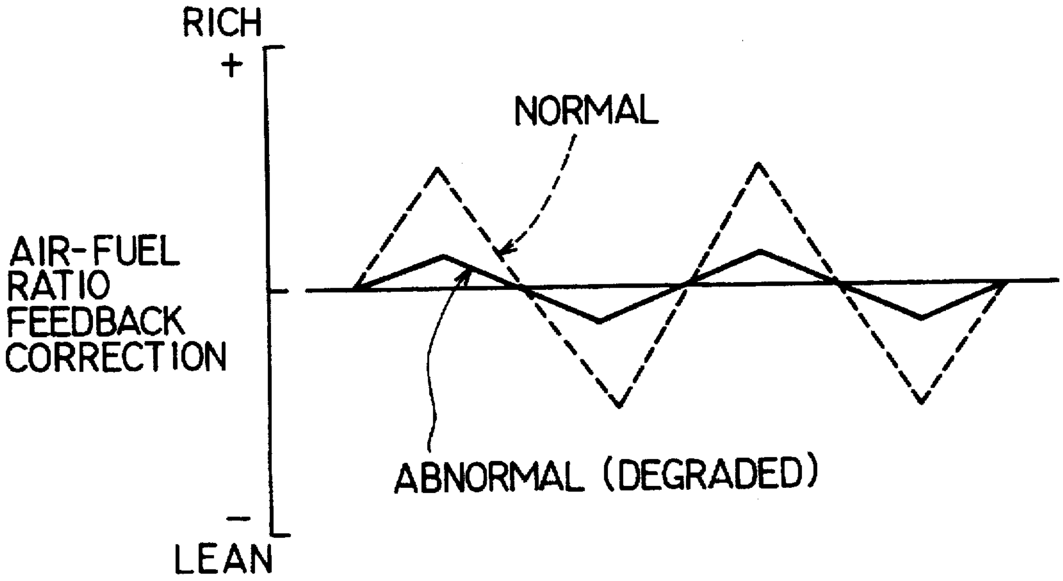
FIG. 5 is a graph showing an elapsed change of air-fuel ratio feedback correction factors.

The output signals of the various sensors described above are input to an electronic engine control unit (hereinafter referred to as "ECU") 36 and are used as engine control data. The ECU 36 operates with the power of a battery 37 and starts the engine 10 by receiving ON signal of an ignition switch 38. It also feedback-controls an air-fuel ratio of air-fuel mixture to be in the vicinity of a stoichiometric air-fuel ratio by increasing/decreasing an air-fuel ratio feedback correction factor as shown in FIG. 5 on the basis of the output signal of the air-fuel ratio sensor 28 during the operation of the engine 10.

Figure 2:
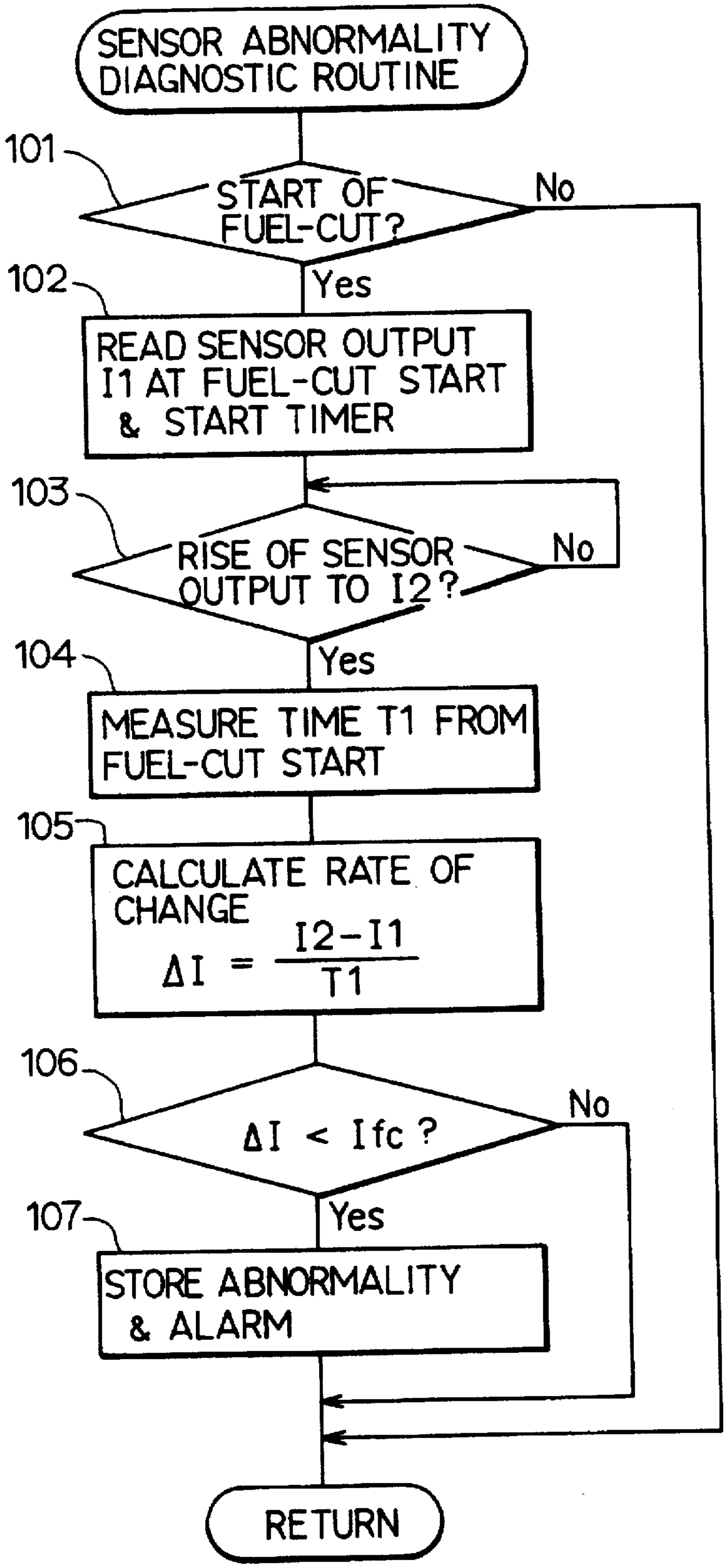
FIG. 2 is a flowchart showing a processing flow of a sensor abnormality diagnostic routine according to the first embodiment.

The ECU 36 also diagnoses an existence of an abnormality of the air-fuel ratio sensor 28 by a sensor abnormality diagnostic routine shown in FIG. 2 and when it is abnormal, informs a driver of that the abnormality by lighting an alarm lamp 39. The sensor abnormality diagnostic routine, which is processed every time a main routine is executed (e.g. per 8 ms), determines a rate of change ΔI of the output current of the air-fuel ratio sensor 28 after the start of fuel-cut at the time of engine deceleration and determines that the sensor is abnormal when the rate of change ΔI is smaller than an abnormality determining value Ifc. FIGS. 3A through 3G show time charts showing operation of the processes when the sensor abnormality diagnostic routine is executed.

In the sensor abnormality diagnostic routine of FIG. 2, it is determined at first whether the fuel-cut has been started or not in Step 101. The timing for executing the fuel-cut is controlled by a fuel-cut determining routine shown in FIG. 6 and time charts showing operation of that process are shown in FIGS. 7A through 7C. This fuel-cut determining routine is also processed every time when the main routine is executed (e.g. per 8 ms). In FIG. 6, when the process is started, it is determined in Step 121, at first, whether a state in which the throttle is fully closed (a state in which a throttle full-close switch is ON) has passed by a predetermined time $T_0$ (FIGS. 7A and 7C) in order to reduce a shock to a vehicle or passengers caused by the fuel-cut during the engine deceleration. If it has passed by the predetermined time $T_0$, it is determined in Step 122 whether a number of revolutions of the engine NE is higher than a number of revolutions for starting the fuel-cut NFC (FIG. 7B). If NE>NFC, a fuel-cut execution flag XFC is set at "1" and the fuel-cut is executed. It is noted that the number of revolutions for starting fuel-cut NFC is set higher when a temperature of cooling water is low so that no fuel-cut is executed during the idling state.

When it is determined to be "No" either in Step 121 or 122 on the other hand, i.e. when the throttle fully closed state has not passed by the predetermined time $T_0$ or when the number of revolutions of engine NE is less than the number of revolutions for fuel-cut NFC, it is determined in Step 123 whether or not the fuel-cut has been executed in the preceding process. If the fuel-cut has been executed in the preceding process, it is determined in Step 124 whether the number of revolutions of the engine NE has dropped below a number of revolutions for returning or restarting the fuel supply from fuel-cut NRT. If it has dropped below the number of revolutions for returning from fuel-cut NRT, the fuel-cut execution flag XFC is set at "0" in Step 125 to return from the fuel-cut and to restart fuel injection (FIGS. 7B and 7C). When it is determined in Step 124 that the number of revolutions of engine NE has not dropped below the number of revolutions for returning from fuel-cut NRT, the fuel-cut is continued proceeding to Step 126. It is noted that if the answer is "No" in Step 123, i.e. when the fuel-cut has not been executed in the preceding process, the fuel injection is executed continuously by proceeding to Step 125.

As described before, in the sensor abnormality diagnostic routine shown in FIG. 2, it is determined in Step 101 at first whether the fuel-cut has been started or not. If no fuel-cut has been started, the sensor abnormality diagnostic routine is finished without executing any process thereafter. This process in Step 101 detects a change in the amount of fuel supplied to the engine 10 which will cause a change in the sensor output. When it is determined to be "Yes" in Step 101 (FIGS. 3A through 3C) at the point of time when the fuel-cut has been started by the process of the fuel-cut determining routine described above, an output (hereinafter referred to as "sensor output") I1 of the air-fuel ratio sensor 28 (FIG. 3D) at the time when the fuel-cut has been started is read and stored and an elapsed time after the start of the fuel-cut is counted by actuating a timer in Step 102. Next, it is determined in Step 103 whether the sensor output has risen to I2. The process waits until the sensor output rises to I2.

When the sensor output rises to I2 after that, a time T1 until the sensor output rises to I2 from when the fuel-cut has been started is read from the count value of the timer described above and stored in Step 104. Then, the rate of change ΔI in the sensor output is calculated in Step 105 by the following equation:

$$\Delta I=(I2-I1)/T1$$

Figures 3A, 3B, 3C, 3D, 3E, 3F, 3G:
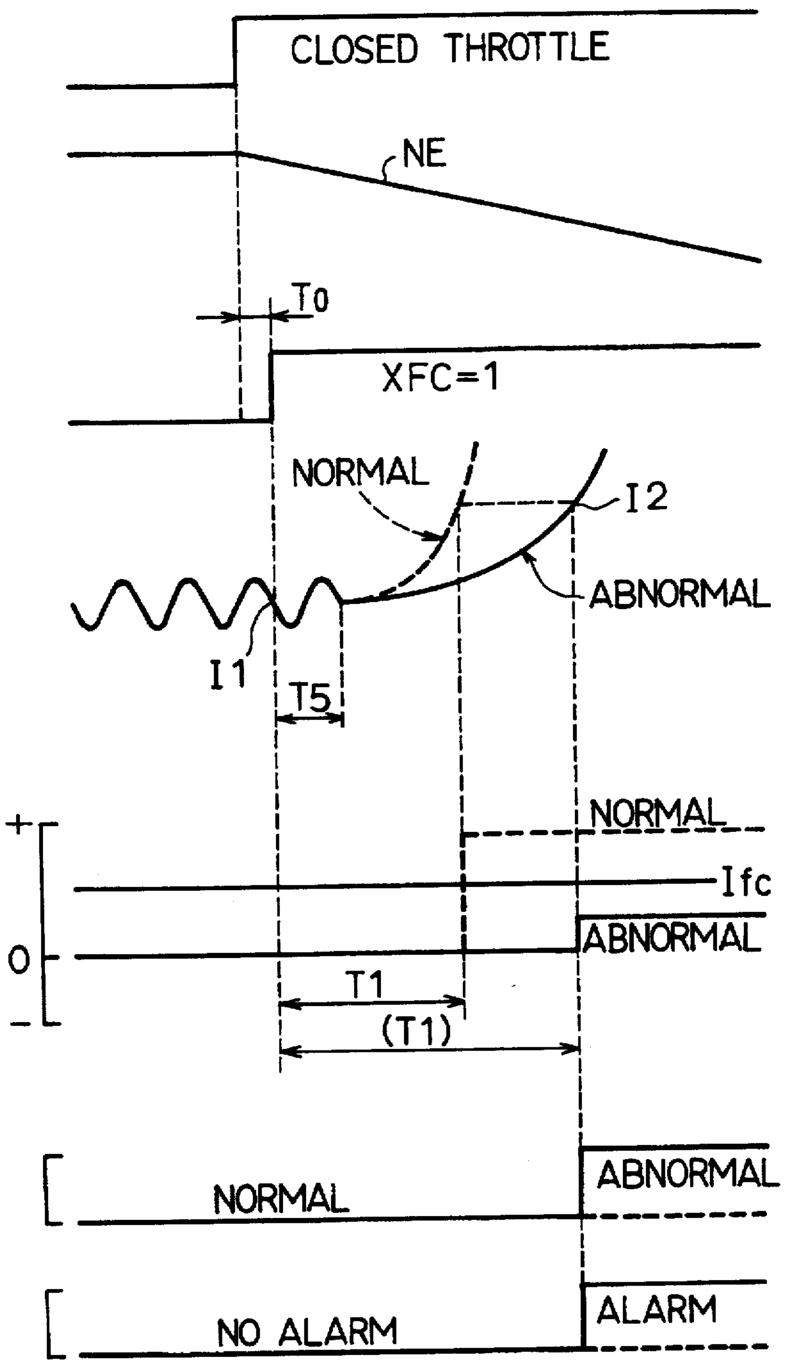
FIGS. 3A through 3G are time charts showing operation of the abnormality diagnosing process of the first embodiment.

Next, the rate of change ΔI of the sensor output calculated by the above equation is compared with the abnormality determining value Ifc in Step 106 (FIG. 3E). If the rate of change ΔI of the sensor output is greater than the abnormality determining value Ifc in response to the fuel amount change, the response characteristic of the air-fuel ratio sensor 28 has not degraded and the sensor output is normal, so that this routine is finished. However, because the rate of change ΔI of the sensor output becomes small as the response characteristic of the air-fuel ratio sensor 28 degrades, it is determined that the air-fuel ratio sensor 28 is abnormal (has degraded) when the rate of change ΔI of the sensor output is less than the abnormality determining value Ifc in spite of the fuel amount change. In this case, the abnormality of the sensor is stored in the memory of the ECU 36 (FIG. 3F) and the alarm lamp 39 is lighted to inform the driver of the abnormality in Step 107 (FIG. 3G).

Figure 4:
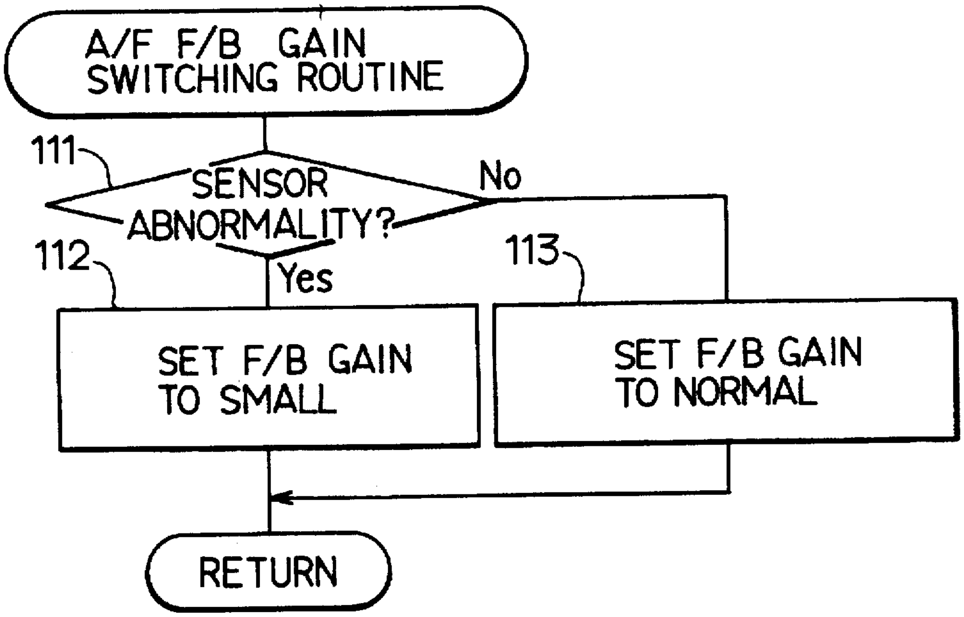
FIG. 4 is a flowchart showing a flow of an air-fuel ratio feedback gain switching routine.

Further, according to the present embodiment, in order to prevent the divergence and hunting of the air-fuel ratio when the sensor is abnormal (degraded), an air-fuel ratio feedback (A/F F/B) gain is switched corresponding to the normality/abnormality of the sensor by an air-fuel ratio feedback gain switching routine shown in FIG. 4. That is, it is determined in Step 111 whether or not the diagnostic result of the sensor abnormality diagnostic routine indicates the abnormality of the sensor. When the sensor is normal, the air-fuel ratio feedback gain (integration constant, skip value, etc.) is set as a normal value in Step 113 and when the sensor is abnormal (degraded), the air-fuel ratio feedback gain is set at a value smaller than the normal value. Thereby, an amplitude of the air-fuel ratio feedback correction factor becomes smaller when the sensor is abnormal (degraded), as compared with the case when the sensor is normal, and the divergence and hunting of the air- fuel ratio may be suppressed as shown in FIG. 5.

By determining the rate of change ΔI of the sensor output after the start of the fuel-cut (after detecting the change in the amount of supplied fuel) and by determining the existence of the abnormality of the sensor by comparing whether or not the rate of change ΔI is smaller than the abnormality determining value Ifc as in the first embodiment described above, the rate of change ΔI of the sensor output after the start of the diagnosis is scarcely affected by the air-fuel ratio before the start of the fuel-cut even when the sensor output varies at the beginning, when the diagnosis is started (when the fuel-cut is started), depending on the state of the air-fuel ratio before the start of the diagnosis (before the start of the fuel-cut), so that the existence of the abnormality of the sensor may be diagnosed without being affected by the state of the air-fuel ratio before the start of the diagnosis and even a slight abnormality of the sensor (degradation of characteristics) may be detected, as compared with the conventional diagnostic method which is susceptible to the influence of the air-fuel ratio before the start of the diagnosis, thus improving the accuracy of the diagnosis. Thereby, the drop of the drivability and the worsening of emissions caused by the abnormality of the sensor (degradation of the characteristics) may be prevented.

While the start of the fuel-cut has been detected as the change in the amount of supplied fuel, which is the condition for starting the diagnosis, in the first embodiment described above, the diagnostic process (determination of rate of change of the sensor output) may be started on condition of the return from the fuel-cut.

Figure 8:
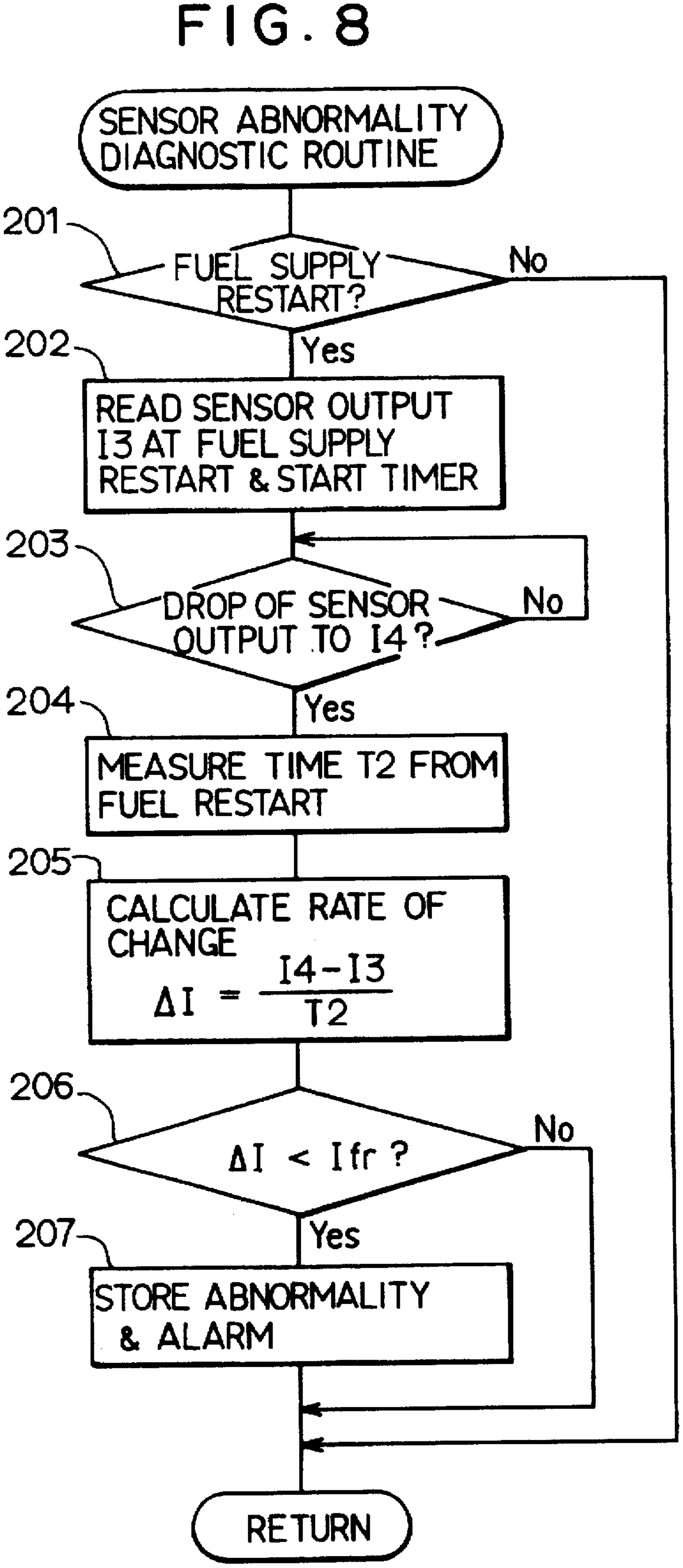
FIG. 8 is a flowchart showing a processing flow of a sensor abnormality diagnostic routine according to a second embodiment.
Figures 9A, 9B, 9C, 9D, 9E, 9F, 9G:
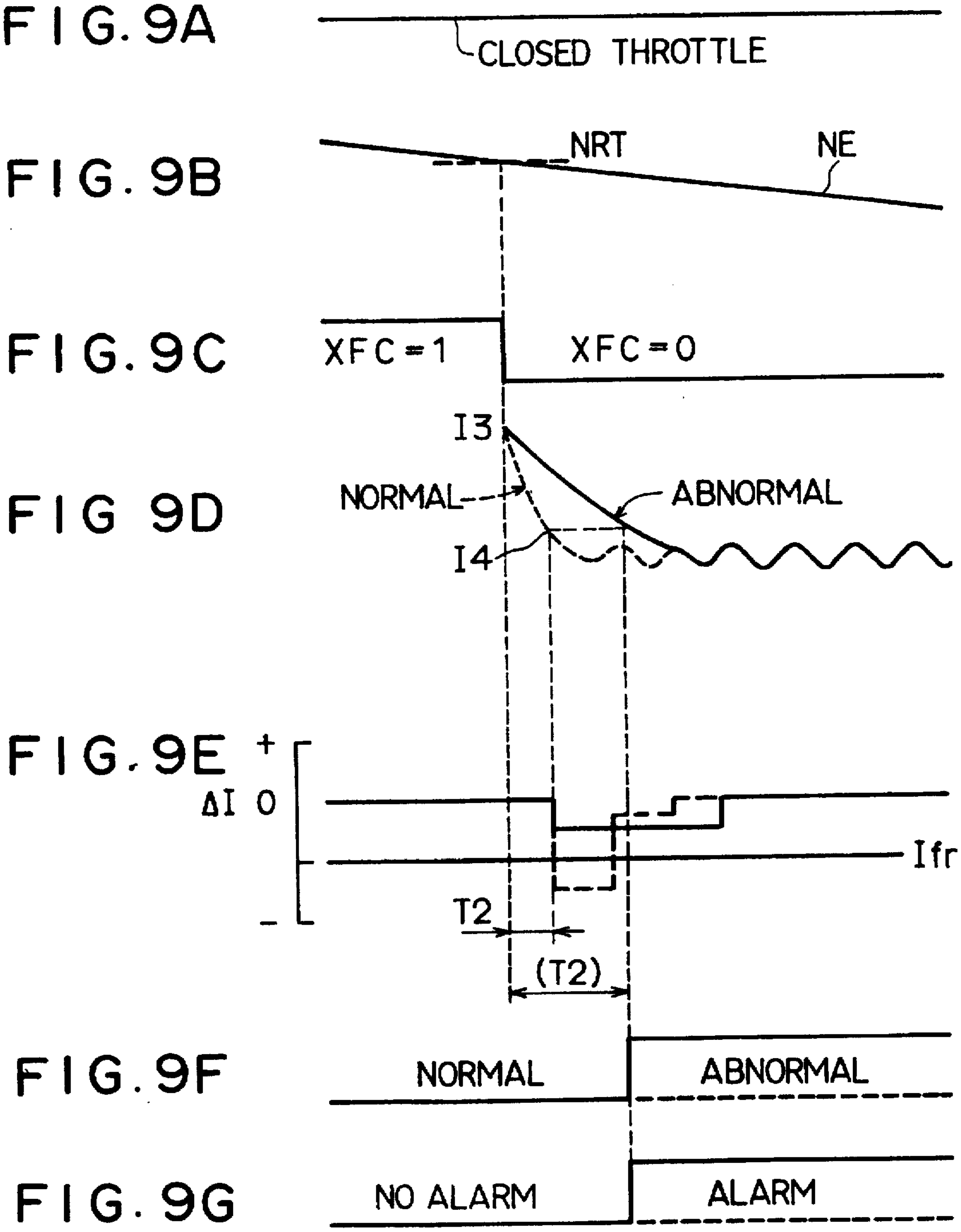
FIGS. 9A through 9G are time charts showing operation of the abnormality diagnosing process of the second embodiment.

A second embodiment of the present invention will be explained below with reference to FIGS. 8 and 9A through 9G. A sensor abnormality diagnostic routine shown in FIG. 8 is processed every time the main routine is executed (e.g. per 8 ms), determines a rate of change ΔI of the sensor output after the return from the fuel-cut and determines an existence of an abnormality of the sensor by comparing the rate of change ΔI with an abnormality determining value Ifr. FIGS. 9A through 9G show time charts showing operation of the process when this sensor abnormality diagnostic routine is executed. In the sensor abnormality diagnostic routine of the second embodiment, it is determined at first whether the fuel-cut has been stopped (fuel injection has been restarted) in Step 201. When it is not the return from the fuel-cut, no process is executed thereafter and the sensor abnormality diagnostic routine is finished. If it is determined to be "Yes" in Step 201 at the time when the return from the fuel-cut has been made (FIGS. 9A through 9C), the sensor output I3 at the time of the return from the fuel-cut is read and stored and the timer is actuated to count an elapsed time after the return from the fuel-cut in Step 202. It is determined in Step 203 whether the sensor output has dropped to I4 or not. The process waits until the sensor output drops to I4 (FIG. 9D).

When the sensor output drops to I4, a time T2 until the sensor output has dropped to I4 from the return from the fuel-cut is read from the count value of the timer described above and stored in Step 204. Then, a rate of change ΔI of the sensor output is calculated in Step 205 by the following equation:

$$\Delta I=(I4-I3)/T2$$

Next, the rate of change ΔI of the sensor output calculated by the above equation is compared with the abnormality determining value Ifr in Step 206. When the rate of change ΔI of the sensor output is greater than or equal to the abnormality determining value Ifr (when $|\Delta I|>|Ifr|$ when absolute values are compared), the response characteristic of the air-fuel ratio sensor 28 has not degraded and the sensor output is normal (FIG. 9E), so that this routine is finished. However, because the absolute value of the rate of change ΔI of the sensor output becomes small as the response characteristic of the air-fuel ratio sensor 28 degrades, it is determined that the air-fuel ratio sensor 28 is abnormal (has degraded) when the rate of change ΔI of the sensor output is less than the abnormality determining value Ifr ($|\Delta I|<|Ifr|$ when the absolute values are compared). In this case, the abnormality of the sensor is stored in the memory of the ECU 36 and the alarm lamp 39 is lighted to inform the driver of the abnormality in Step 207 (FIGS. 9F and 9G).

The start of the fuel-cut or the return from the fuel-cut has been detected as the change in the amount of supplied fuel which is the condition for starting the diagnosis in the first and second embodiments described above, it is possible to set a change in a target air-fuel ratio or a change in a value of increased fuel or a value of decreased fuel, which leads to the change in the amount of supplied fuel, as the condition for starting the diagnosis.

Figure 10:
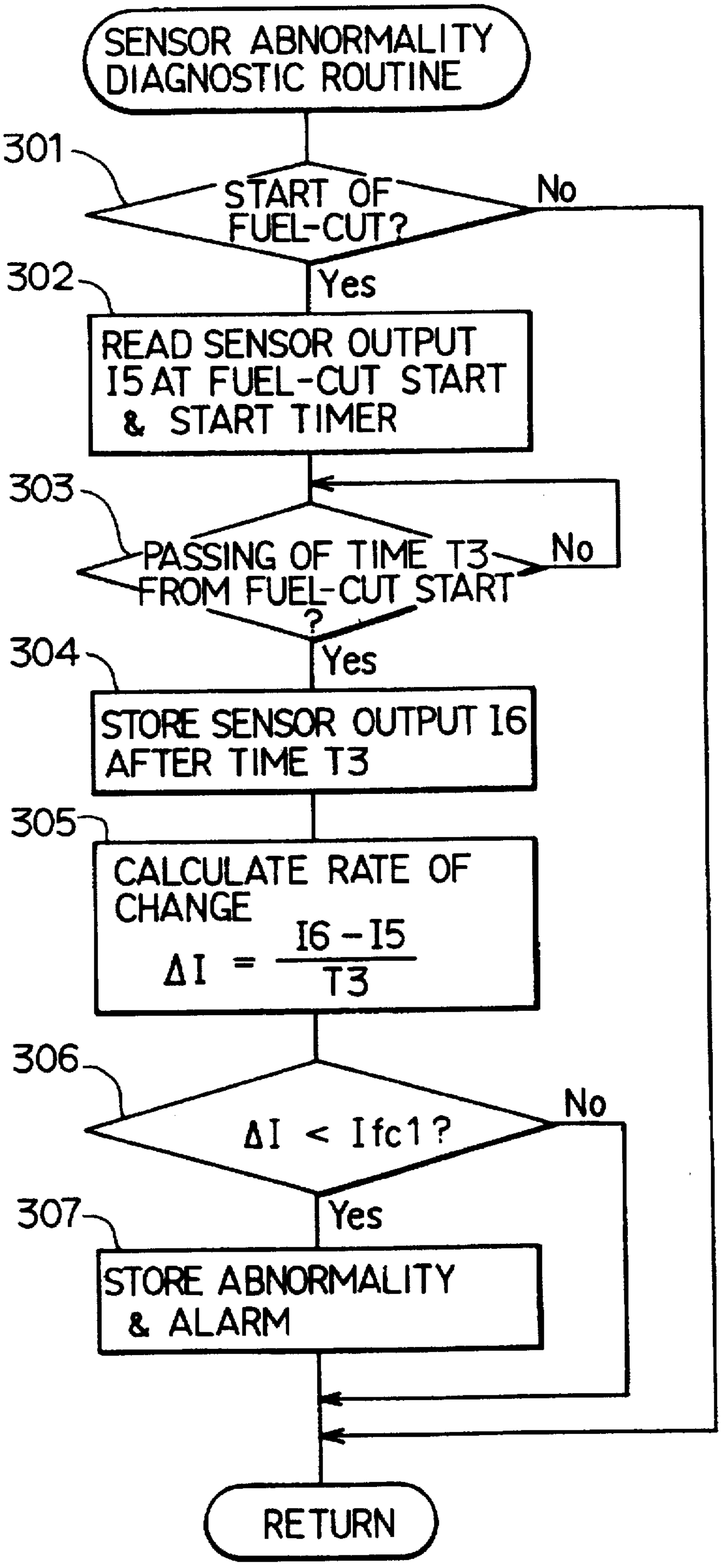
FIG. 10 is a flowchart showing a processing flow of a sensor abnormality diagnostic routine according to a third embodiment.

Further, although the rate of change ΔI of the sensor output has been determined by measuring the times T1 or T2 until the sensor output changes to the predetermined value I2 or I4 and by dividing the predetermined variation of the sensor output by the times T1 or T2 in the first and second embodiments, it is possible to determine the rate of change ΔI of the sensor output by measuring a variation within a predetermined time and by dividing the variation by the predetermined time. A third embodiment shown in FIGS. 10 and 11 and a fourth embodiment shown in FIGS. 12 and 13 embody this approach.

Figures 11A, 11B, 11C, 11D, 11E, 11F, 11G:
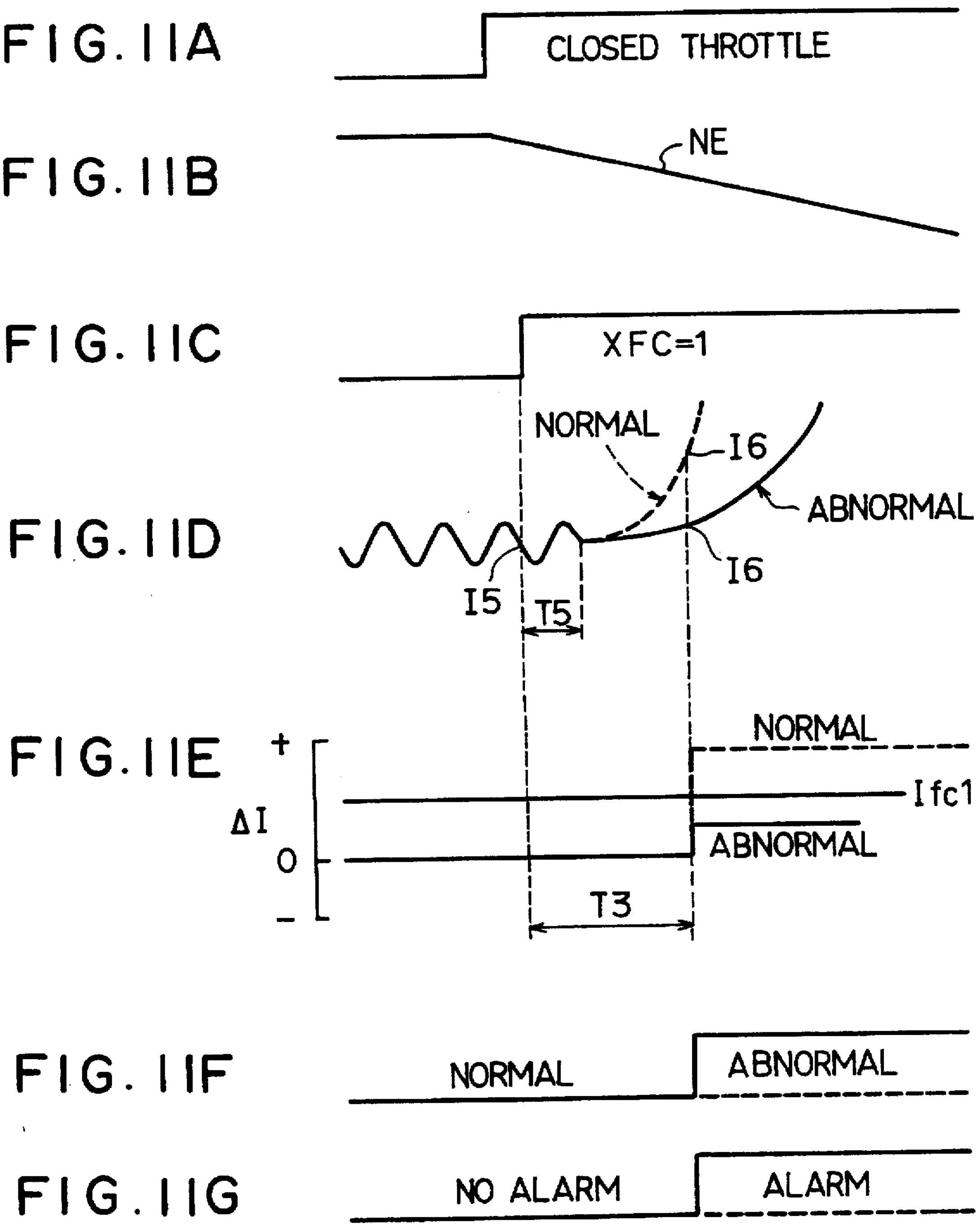
FIGS. 11A through 11G are time charts showing operation of the abnormality diagnosing process of the third embodiment.

The third embodiment shown in FIGS. 10 and 11A through 11G is an embodiment which corresponds to the first embodiment which determines the rate of change ΔI of the sensor output after the start of the fuel-cut. It is different from the first embodiment only in the processes in Steps 303 and 304 and the corresponding operation (FIGS. 11D and 11E). Other processes and operation are substantially the same as the first embodiment. In the third embodiment, a sensor output I5 at the start of the fuel-cut is read and stored in Step 302. A sensor output I6 at the point of time when a predetermined time T3 has passed is read and stored in Steps 303 and 304 and the rate of change ΔI of the sensor output is calculated in Step 305 by the following equation:

$$\Delta I=(I6-I5)/T3$$

Figure 12:
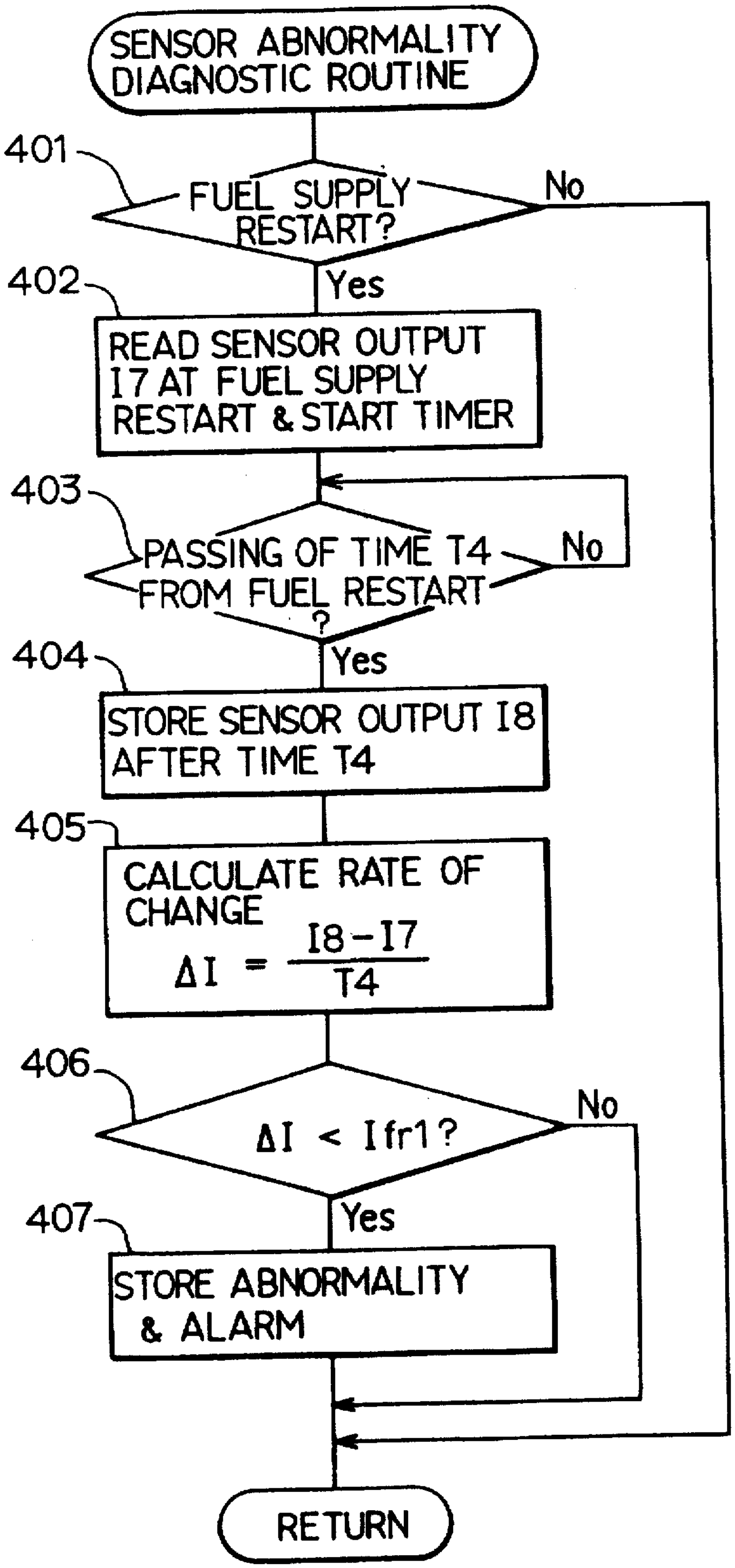
FIG. 12 is a flowchart showing a processing flow of a sensor abnormality diagnostic routine according to a fourth embodiment.
Figures 13A, 13B, 13C, 13D, 13E, 13F, 13G:
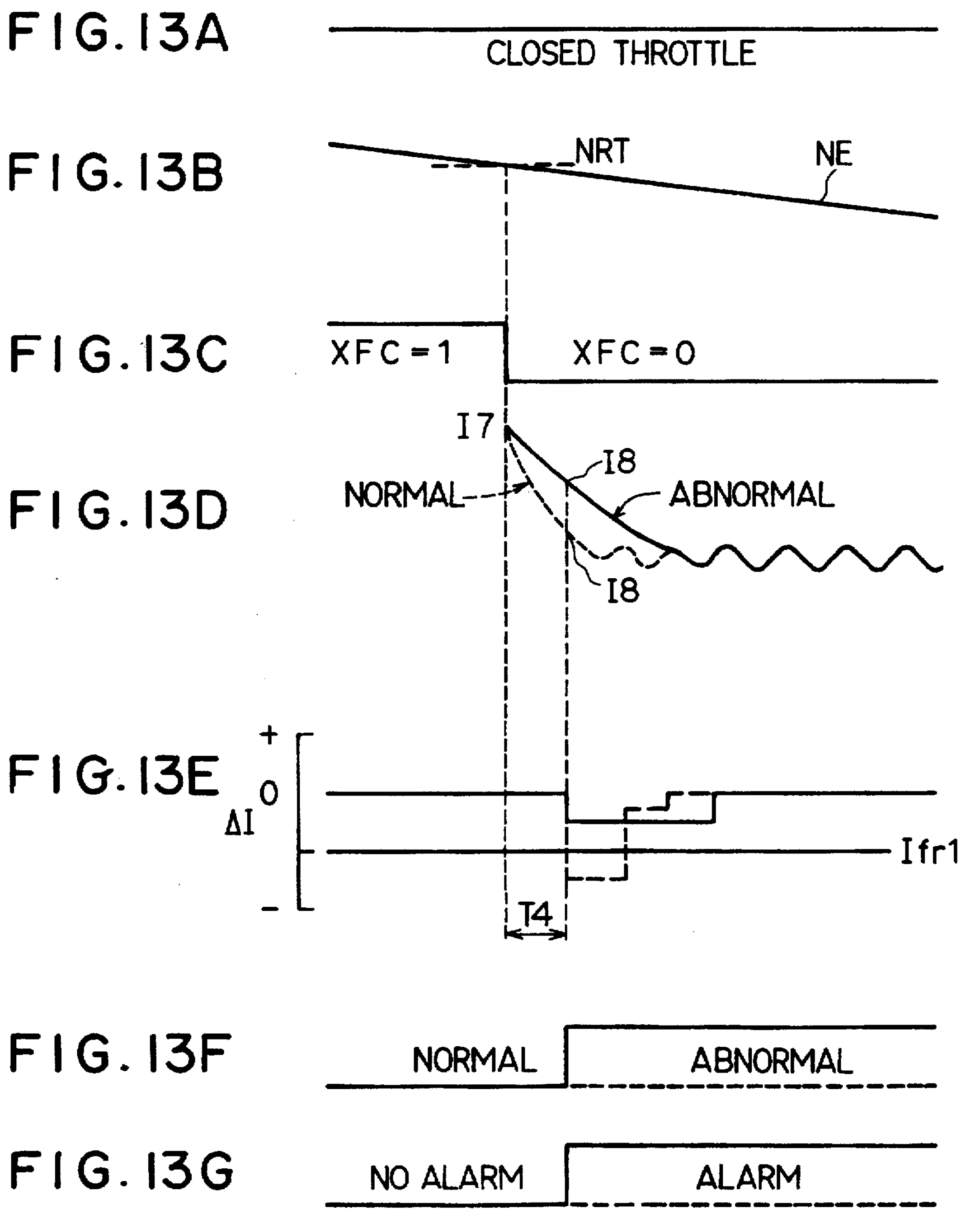
FIGS. 13A through 13G are time charts showing operation of the abnormality diagnosing process of the fourth embodiment.

The fourth embodiment shown in FIGS. 12 and 13 is an embodiment which corresponds to the second embodiment which determines the rate of change ΔI of the sensor output after the return from the fuel-cut. It is different from the second embodiment only in the processes in Steps 403 and 404 and the corresponding operations (FIGS. 13D and 13E). Other processes and operation are substantially the same as the second embodiment. In the fourth embodiment, a sensor output I7 at the return from the fuel-cut is read and stored in Step 402, a sensor output I8 at the point of time when a predetermined time T4 has passed is read and stored in Steps 403 and 404 and the rate of change ΔI of the sensor output is calculated in Step 405 by the following equation:

$$\Delta I=(I8-I7)/T4$$

It is to be noted that there is a response time lag T5 until the sensor output starts to change from the start of the fuel-cut as shown in FIGS. 3D and 11D. The response characteristic of the air- fuel ratio sensor 28 is apt to become slow and the response time lag T5 to be prolonged as the characteristic of the air-fuel ratio sensor 28 degrades.

Then, in a fifth embodiment shown in FIGS. 14 and 15A through 15F, a response time lag T9 until the sensor output starts to change from the start of the fuel-cut is measured and is compared with an abnormality determining value Tfc to determine whether the sensor is abnormal. A sensor output I9 at the start of the fuel-cut is read and stored and the timer is actuated to count an elapsed time after the start of the fuel-cut in Steps 501 and 502. Next, the process waits until the sensor output rises to I9+Δi (where, Δi is a width of change which is recognized as a rise of the output) in Step 503. When the sensor output rises to I9+Δi (FIG. 15D), the response time lag T9 until the sensor output has risen to I9+Δi from the start of the fuel-cut is read from the count value of the timer described above. After that, the response time lag T9 is compared with the abnormal determining value Tfc in Step 505. If T9≦Tfc, the response characteristic of the air-fuel ratio sensor 28 has not degraded and the sensor output is normal, so that this routine is finished. However, if T9 (=T9')>Tfc, the response characteristic of the air-fuel ratio sensor 28 has degraded, so that the air-fuel ratio sensor 28 is determined to be abnormal (degraded). Then, the abnormality of the sensor is stored in the memory of the ECU 36 and the alarm lamp 39 is lighted to inform the driver of the abnormality in Step 506. In this case, the processes in Steps 503 and 504 function as a timer.

A sixth embodiment of the present invention illustrated in FIGS. 16 and 17A through 17F enhances the measurement accuracy of the rate of change ΔI by starting to measure the rate of change ΔI of the sensor output after an elapse of a response time lag T10 after the start of the fuel-cut. The sixth embodiment corresponds to the third embodiment shown in FIGS. 10 and 11A through 11G which determines the rate of change ΔI by dividing a variation of the sensor output within a predetermined time by the predetermined time. A flowchart shown in FIG. 16 will be explained below with reference to the operation in the time charts in FIGS. 17A through 17F.

Figure 14:
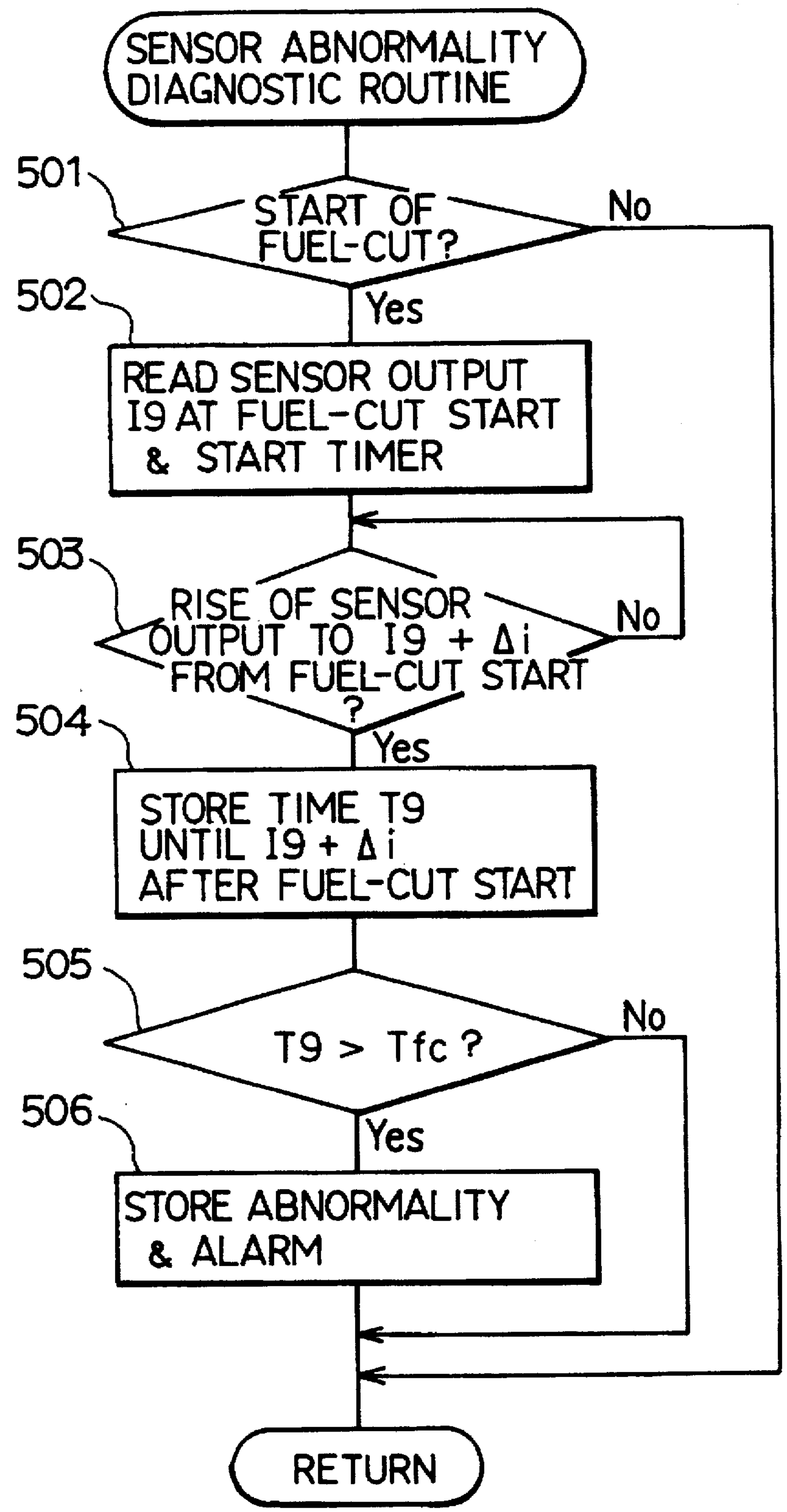
FIG. 14 is a flowchart showing a processing flow of a sensor abnormality diagnostic routine according to a fifth embodiment.
Figure 16:
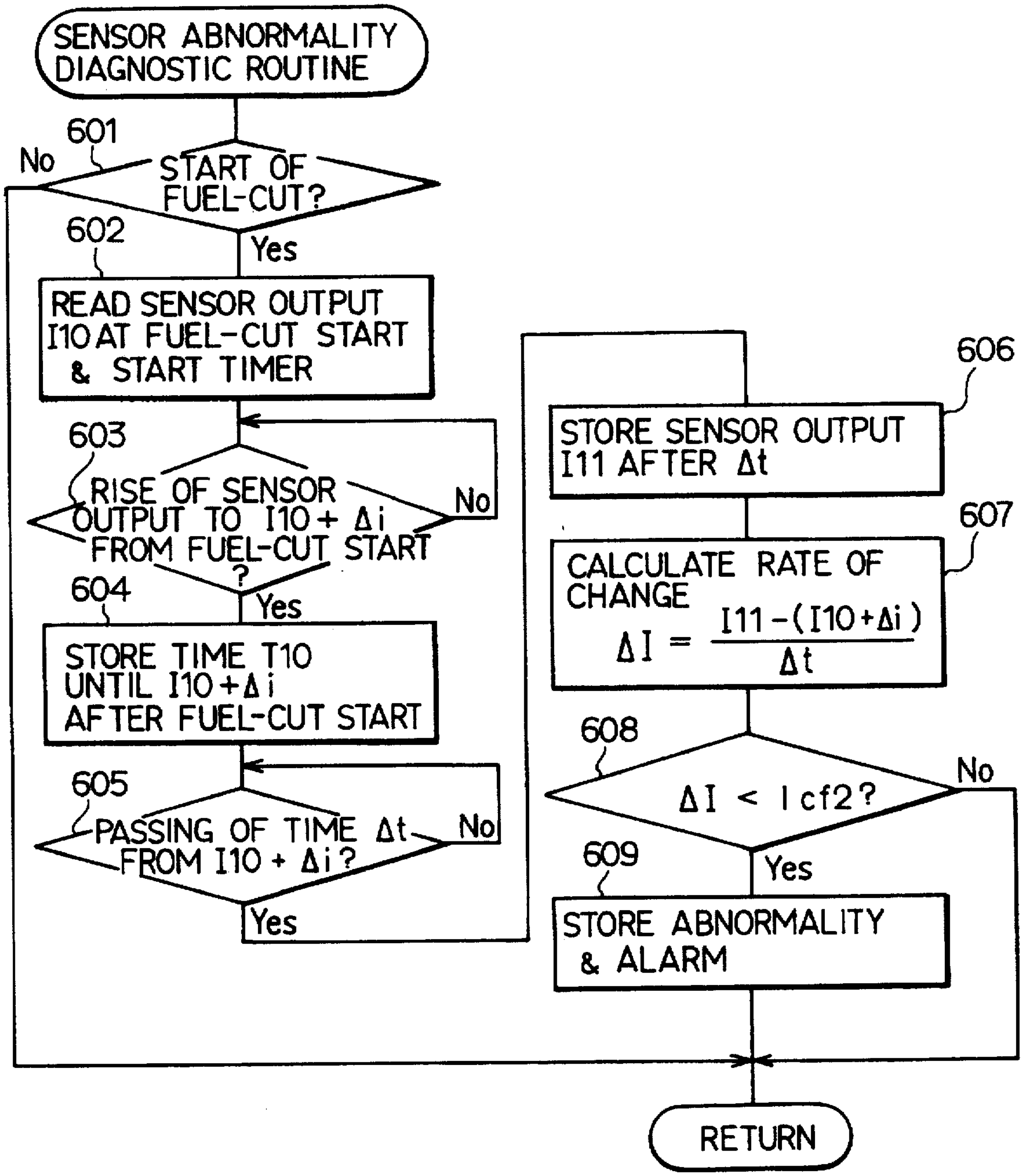
FIG. 16 is a flowchart showing a processing flow of a sensor abnormality diagnostic routine according to a sixth embodiment.

Processes in Steps 601 through 604 are the same as the processes in Steps 501 through 504 in FIG. 14, wherein a sensor output I10 at the start of the fuel-cut is determined and stored and the response time lag T10 until the sensor output rises to I10+Δi from the start of the fuel-cut is measured and stored. In Step 605, the process waits until a predetermined time At passes from when the sensor output has risen to I10+Δi. After the predetermined time At has passed, a sensor output Ill is read and stored in Step 606. In Step 607, the rate of change ΔI of the sensor output is calculated by the following equation:

$$\Delta I=\{I11-(I10+\Delta i)\}/\Delta t$$

After that, the rate of change ΔI of the sensor output is compared with an abnormality determining value Icf2 in Step 608. If ΔI<Icf2, that, in the case of I11' and T10' (FIG. 17D), it is determined that the air-fuel ratio sensor 28 is abnormal (degraded) and the abnormality of the sensor is stored in the memory in the ECU 36 and the alarm lamp 39 is lighted to inform the driver of the abnormality in Step 609.

It is noted that it is possible to start to measure the rate of change ΔI of the sensor output after the elapse of the response time lag T10 after the start of the fuel-cut also in the first embodiment. Further, the concepts of the fifth and sixth embodiments are not confined only to the case of detecting the change in the amount of supplied fuel at the start of the fuel-cut but are applicable also to other cases like at the restart of fuel supply from the fuel-cut.

Further, although the variation per unit time has been determined as the rate of change ΔI of the sensor output by dividing the variation of the sensor output by the time in every embodiment except for the fifth embodiment, the rate of change of the sensor output may be determined indirectly, without directly calculating the rate of change ΔI of the sensor output, as follows:

(1) A time until when the sensor output changes by a predetermined amount after the amount of supplied fuel has changed is measured and the rate of change of the sensor output is determined indirectly by the length of the measured time. That is, it utilizes the relationship that the longer the measured time, the smaller the rate of change of the sensor output and the shorter the measured time, the greater the rate of change of the sensor output. In this case, the variation of the sensor output needs not be divided by the measured time; and (2) A variation of the sensor output which changes within a predetermined time after the amount of supplied fuel has changed is determined and the rate of change of the sensor output is determined indirectly by the degree of the variation. That is, it utilizes the relationship that the greater the variation within the predetermined time, the greater the rate of change of the sensor output and the smaller the variation within the predetermined time, the smaller the rate of change of the sensor output. In this case also, the variation of the sensor output need not be divided by the time.

The modification (1) or (2) above has an advantage because the variation of the sensor output need not be divided by the time resulting in less of a computation load. Further, a detection circuit for detecting the rate of change (gradient) of the sensor output by way of hardware may be provided.

It is noted that the determination of the change in the amount of supplied fuel and the rate of change of the sensor output may be implemented by appropriately combining each embodiment described above. For example, the abnormality of sensor may be determined at the both the start of the fuel-cut and the return from the fuel-cut.

Further, although the air-fuel ratio sensor 28 whose output changes generally linearly in response to an air-fuel ratio within an exhaust gas has been used in the embodiments described above, an oxygen sensor whose output changes stepwise or nonlinearly in response to concentration of oxygen within an exhaust gas may be used.

Still more, although the alarm lamp is used for warning the driver when the sensor is abnormal in the embodiments described above, it is possible to warn the driver of the abnormality of the sensor by sound by means of a buzzer for example or by roughening a number of revolutions of the engine by periodically changing the fuel supply or ignition timing.

As it is apparent from the above descriptions, according to the one aspect of the present invention, the rate of change of the sensor output after the change in the amount of supplied fuel is determined and on the basis of the rate of change of the sensor output, existence of an abnormality of the sensor is determined, so that the existence of the abnormality of the sensor may be diagnosed without being affected by the state of the air- fuel ratio before the start of the diagnosis even when the sensor output at the beginning, when the diagnosis is started, (at the beginning, when the change in the amount of supplied fuel is detected) changes depending on the state of the air-fuel ratio before the start of the diagnosis (before the detection of the change in the amount of supplied fuel). Thus, the diagnostic accuracy may be improved.

Furthermore, when the start of the fuel-cut or the return from the fuel-cut is detected and thereby the change in the amount of supplied fuel is detected indirectly, the timing when the amount of supplied fuel changes significantly may be accurately detected.

Further, when the variation per unit time is determined as the rate of change of the sensor output, it allows the abnormality of the sensor to be determined by directly detecting the rate of change of the sensor output.

Further, in the case that the time until the sensor output changes by a predetermined amount after the amount of supplied fuel has changed is measured and the rate of change of the sensor output is determined indirectly by the length of the measured time, the variation of the sensor output need not be divided by the measure time, thus reducing the computation load.

When the variation of the sensor output which changes within a predetermined time after the amount of supplied fuel has changed is determined and the rate of change of the sensor output is determined indirectly by the degree of the variation, the variation need not be divided by the time similarly, thus reducing the computation load.

According to another aspect of the invention, a response time lag until the output of the sensor starts to change after the amount of supplied fuel has changed is measured, instead of determining the rate of change of the sensor output described above, the existence of the abnormality of the sensor is determined on the basis of the response time lag, so that the existence of the abnormality of the sensor can be diagnosed without being affected by the state of the air-fuel ratio before the start of the diagnosis and the diagnostic accuracy may be improved similarly to the cases in which the rate of change of the sensor output is determined.

While preferred embodiments have been described, variations thereto will occur to those skilled in the art within the scope of the present inventive concept which is delineated by the following claims.

What is claimed is:

1. In combination:

a sensor for detecting an air-fuel ratio within an exhaust gas of an internal combustion engine, said sensor having an output which varies proportionally with the detected air-fuel ratio; and a self-diagnostic apparatus of an air-fuel ratio control system of said internal combustion engine for self-diagnosing an abnormality of said air-fuel ratio control system which feedback-controls an air-fuel mixture supplied to said internal combustion engine by said output of said sensor, said self-diagnostic apparatus comprising:

detecting means for detecting a change in an amount of fuel supplied to said internal combustion engine, rate-of-change determining means for determining a rate of change of the output of said sensor after said detecting means detects said change in the amount of supplied fuel by said detecting means, and abnormality determining means for determining an existence of an abnormality of said sensor on the basis of the rate of change of the output of said sensor determined by said rate-of-change determining means.

2. The combination according to claim 1, wherein said detecting means detects at least one of starting a fuel-cut and returning from a fuel-cut as the change in the amount of supplied fuel.

3. The combination according to claim 2, wherein said rate-of-change determining means determines a variation of the output of said sensor per unit time as the rate of change of the output of said sensor.

4. The combination according to claim 2, wherein said rate-of-change determining means measures a time until the output of said sensor changes by a predetermined value from when said amount of supplied fuel has changed and determines the rate of change of the output of said sensor by a length of the measured time.

5. The combination according to claim 2, wherein said rate-of-change determining means determines a variation of the output of said sensor which changes within a predetermined time from when said amount of supplied fuel has changed and determines the rate of change of the output of said sensor by a degree of the variation.

6. The combination according to claim 1, wherein said rate-of-change determining means determines a variation of the output of said sensor per unit time as the rate of change of the output of said sensor.

7. The combination according to claim 1, wherein said rate-of-change determining means measures a time until the output of said sensor changes by a predetermined value from when said amount of supplied fuel has changed and determines the rate of change of the output of said sensor by a length of the measured time.

8. The combination according to claim 1, wherein said rate-of-change determining means determines a variation of the output of said sensor which changes within a predetermined time from when said amount of supplied fuel has changed and determines the rate of change of the output of said sensor by a degree of the variation.

9. The combination according to claim 1, wherein said detecting means comprises:

an engine control unit including counter means for counting elapsed time;

a throttle opening sensor electrically connected to said engine control unit and outputting a first signal to said engine control unit; and a crank angle sensor electrically connected to said engine control unit and outputting a second signal to said engine control unit.

10. The combination according to claim 1, wherein said rate of change determining means comprises:

a counter to count an elapsed time period.

11. In combination:

a sensor for detecting an air-fuel ratio within an exhaust gas of an internal combustion engine, said sensor having an output which varies proportionally with the detected air-fuel ratio; and a self-diagnostic apparatus of an air-fuel ratio control system of said internal combustion engine for self-diagnosing an abnormality of said air-fuel ratio control system which feedback-controls an air-fuel mixture supplied to said internal combustion engine by said output of said sensor, said self-diagnostic apparatus comprising:

detecting means for detecting a predetermined engine condition change upon which an amount of fuel supplied to said internal combustion engine is greatly changed, rate-of-change determining means for determining a rate of change of the output of said sensor upon said detecting means detecting said predetermined engine condition change, and abnormality determining means for determining an existence of an abnormality of said sensor on the basis of the rate of change of the output of said sensor determined by said rate-of-change determining means.

12. The combination according to claim 11, further comprising:

delaying means for delaying operation of said rate-of-change detecting means until the output of said sensor changes by a predetermined amount after detection of said predetermined engine condition change.

13. The combination according to claim 11, wherein said predetermined engine condition change includes a change between a fuel-cut and a fuel supply.

14. The combination according to claim 11, wherein said detecting means detects at least one of starting a fuel-cut and returning from a fuel-cut as the predetermined engine condition change upon which the amount of fuel supplied to said internal combustion engine is greatly changed.

15. The combination according to claim 11, wherein said detecting means comprises:

an engine control unit including counter means for counting elapsed time;

a throttle opening sensor electrically connected to said engine control unit and outputting a first signal to said engine control unit; and a crank angle sensor electrically connected to said engine control unit and outputting a second signal to said engine control unit.

16. The combination according to claim 11, wherein said rate of change determining means comprises:

a counter to count an elapsed time period.

17. The combination according to claim 1, wherein said abnormality determining means is equipped with alarm means for warning of said abnormality when said abnormality determining means determines that said sensor is abnormal.

18. In combination:

a sensor for detecting an air-fuel ratio within an exhaust gas of an internal combustion engine, said sensor having an output which varies proportionally with the detected air-fuel ratio; and a self-diagnostic apparatus of an air-fuel ratio control system of said internal combustion engine for self-diagnosing an abnormality of said air-fuel ratio control system which feedback-controls an air-fuel mixture supplied to said internal combustion engine by said output of said sensor, said self-diagnostic apparatus comprising:

detecting means for detecting a change in an amount of fuel supplied to said internal combustion engine, timer means for measuring a response time lag until the output of said sensor starts to change after detecting the change in the amount of supplied fuel by said detecting means, and abnormality determining means for determining an existence of an abnormality of said sensor on the basis of the response time lag measured by said timer means.

19. The combination according to claim 18, wherein said detecting means comprises:

an engine control unit including counter means for counting elapsed time;

a throttle opening sensor electrically connected to said engine control unit and outputting a first signal to said engine control unit; and a crank angle sensor electrically connected to said engine control unit and outputting a second signal to said engine control unit.

20. In combination:

a sensor for detecting an air-fuel ratio within an exhaust gas of an internal combustion engine, said sensor having an output which varies proportionally with the detected air-fuel ratio; and a self-diagnostic apparatus of an air-fuel ratio control system of said internal combustion engine for self-diagnosing an abnormality of said air-fuel ratio control system which feedback-controls an air-fuel mixture supplied to said internal combustion engine by said output of said sensor, said self-diagnostic apparatus comprising:

detecting means for detecting an engine condition which causes a large change over a short period of time in an mount of fuel supplied to said internal combustion engine;

rate-of-change determining means for determining a rate of change as a change in the output of the sensor per unit time by detecting the change in the output of the sensor and a time required for the change; and said sensor being of a type having the output varying proportionally with the detected air-fuel ratio.

21. The combination according to claim 20, further comprising:

abnormality determining means for determining an existence of an abnormality of said sensor based on the change in the output of the sensor per unit time measured by the rate-of-change determining means.

22. The combination according to claim 21, wherein said abnormality determining means includes alarm means for warning of said abnormality when said abnormality means determines that said sensor is abnormal.

23. The combination according to claim 22, wherein said alarm means is an alarm lamp.

24. The combination according to claim 20, wherein said detecting means detects at least one of starting a fuel-cut and returning from the fuel-cut as the engine condition which causes the large change over the short period of time in the amount of fuel supplied to said internal combustion engine.

25. The combination according to claim 20, wherein said detecting means comprises:

an engine control unit including counter means for counting elapsed time;

a throttle opening sensor electrically connected to said engine control unit and outputting a first signal to said engine control unit; and a crank angle sensor electrically connected to said engine control unit and outputting a second signal to said engine control unit.

26. The combination according to claim 20, wherein said rate of change determining means comprises:

a counter to count an elapsed time period.

* * * * *